United States Patent [19]

Shafer

[11] 4,400,361

[45] Aug. 23, 1983

[54] METHOD OF REMOVING H₂S FROM A GAS STREAM UTILIZING BORON-VANADIUM AND IRON COMPLEXES

[75] Inventor: Ronald E. Shafer, Overland Park, Kans.

[73] Assignee: Purtec Systems, Inc., Overland Park, Kans.

[21] Appl. No.: 363,647

[22] Filed: Mar. 30, 1982

[51] Int. Cl.³ .............................................. B01D 53/34
[52] U.S. Cl. ..................................... 423/226; 423/224; 423/225; 423/574 R
[58] Field of Search .................... 423/573 R, 224, 225, 423/226, 574 R

[56] References Cited

U.S. PATENT DOCUMENTS

| | | |
|---|---|---|
| 999,799 | 7/1865 | Nichol et al. . |
| 999,800 | 7/1865 | Nichol et al. . |
| 2,037,071 | 5/1960 | Giammarco . |
| 2,943,910 | 7/1960 | Giammarco . |
| 2,997,439 | 8/1961 | Nicklin et al. . |
| 3,035,889 | 5/1962 | Nicklin et al. . |
| 3,097,926 | 7/1963 | Nicklin et al. . |
| 3,226,320 | 12/1965 | Meuly et al. . |
| 3,438,811 | 4/1969 | Harriman et al. . |
| 3,642,448 | 2/1972 | Beavon . |
| 3,756,950 | 9/1973 | Gluck . |
| 3,923,954 | 12/1975 | Petrey, Jr. et al. . |
| 3,928,535 | 12/1975 | Schulz . |
| 3,937,795 | 2/1976 | Hasebe . |
| 3,975,508 | 8/1976 | Richardson et al. . |
| 4,002,727 | 1/1977 | Sonoda et al. . |
| 4,009,251 | 2/1977 | Meuly . |
| 4,011,304 | 3/1977 | Mancini et al. . |
| 4,036,942 | 7/1977 | Sibeud et al. ................... 423/226 |
| 4,044,101 | 8/1977 | Misamatsu et al. . |
| 4,049,776 | 9/1977 | Nicklin et al. . |
| 4,060,594 | 11/1977 | Fenton et al. ................... 423/573 R |
| 4,080,424 | 3/1978 | Miller et al. . |
| 4,083,945 | 4/1978 | Fenton et al. . |
| 4,085,060 | 4/1978 | Vassileff . |
| 4,091,073 | 5/1978 | Winkler . |
| 4,098,886 | 7/1978 | Nicklin et al. . |
| 4,119,557 | 10/1978 | Postelthwaite . |
| 4,125,597 | 11/1978 | Fleck . |

FOREIGN PATENT DOCUMENTS 948270  1/1964  United Kingdom ................ 423/226

OTHER PUBLICATIONS

"Hydrogen Sulphide Removal by the Stretford Liquid Purification Process" by T. Nicklin & E. Brunner, May 1961.

Primary Examiner—Earl C. Thomas
Assistant Examiner—Jackson Leeds
Attorney, Agent, or Firm—Schmidt, Johnson, Hovey & Williams

[57] ABSTRACT

A process for removing hydrogen sulfide from sour gas streams is provided wherein the sour gas is passed in cocurrent flow relationship with a liquid alkaline absorption solution containing a vanadium-boron complex characterized by the properties of reacting with the H₂S thereby oxidizing [HS⁻] to elemental sulfur in conjunction with reduction of the vanadium while the boron constituent is functional to inhibit formation of insoluble vanadium sulfide compounds. Regeneration of the absorption medium by contact with an oxygen containing gas is enhanced by the provision of an iron-polyamine organic acid oxidation catalyst in the absorption liquid. The process is a direct replacement for and may be operated far more economically than conventional Stretford processes.

30 Claims, 1 Drawing Figure

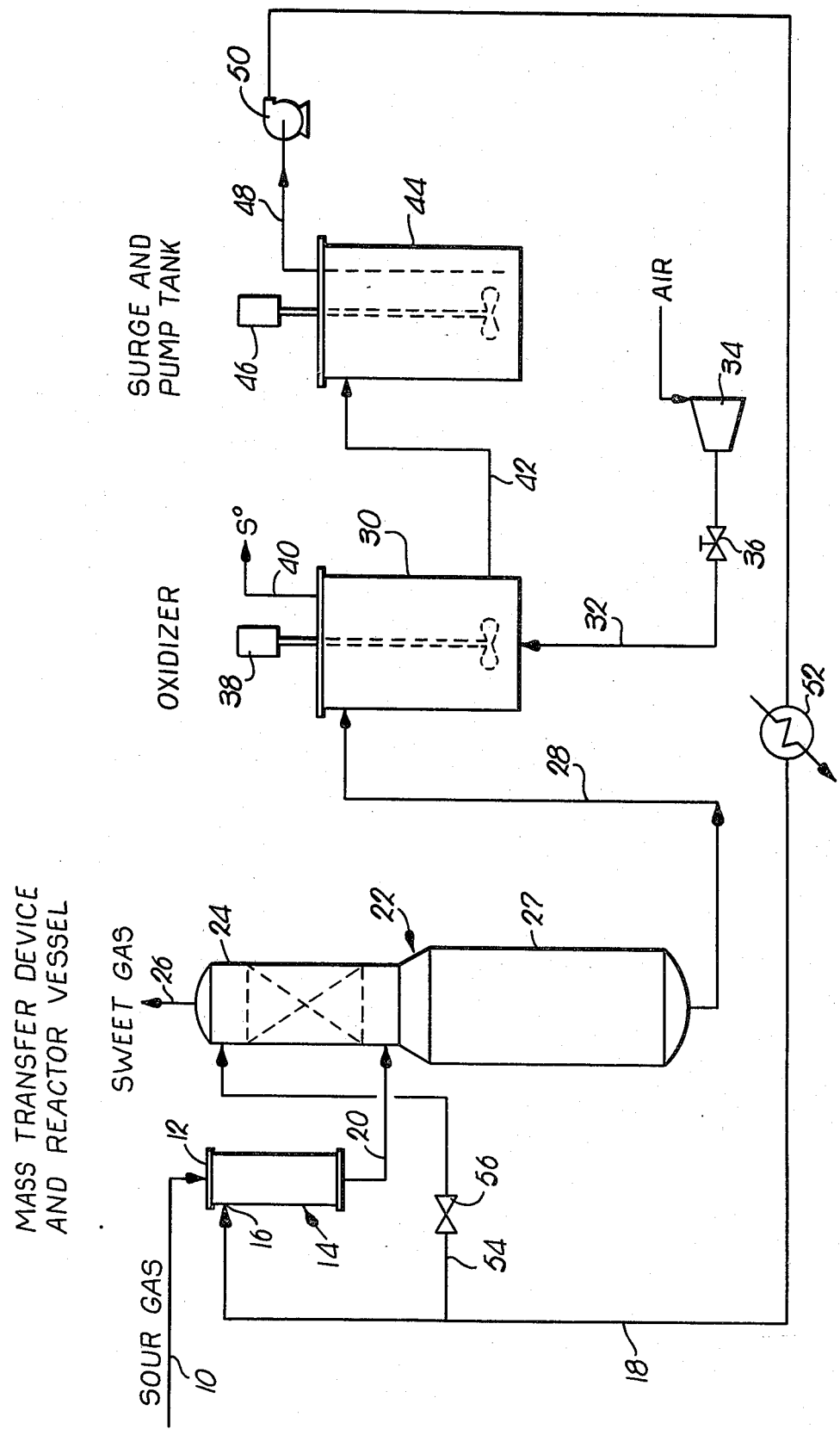

METHOD OF REMOVING H₂S FROM A GAS STREAM UTILIZING BORON-VANADIUM AND IRON COMPLEXES

This invention relates to a process for removing hydrogen sulfide from sour gas streams wherein the $H_2S$ is converted to elemental sulfur in a liquid absorption medium and the solution is then regenerated for reuse in conjunction with recovery of the free sulfur.

BACKGROUND OF THE INVENTION

A. Prior Art Processes

In the 1960's, Thomas Nicklin and others devised a method for continuous removal of hydrogen sulfide from sour gas streams using an aqueous alkaline absorption solution containing sodium salts of anthraquinone disulfonic acids resulting in the precipitation of elemental sulfur. During this work, it was found that addition of sodium vanadates to the anthraquinone disulfonic acid constituents improved the spread of conversion of hydrogen sulfide to sulfur and increased the hydrosulfide loading of the washing agent. A comprehensive disclosure of the method (referred to as the Stretford Process) is contained in an article by Nicklin and E. Brunner published during the 98th General Meeting of the Institute of Gas Engineers meeting at London, England, May 16-19, 1961.

A number of patents have issued since that time including U.S. Pat. No. 3,035,889 of May 22, 1962 which teaches that when a gas containing hydrogen sulfide is washed with an aqueous alkaline solution of one or more anthraquinone disulfonic acids, the hydrogen sulfide is oxidized liberating free sulfur as the anthraquinone disulfonic acid constituents are reduced. Recovery of the elemental sulfur is disclosed as being feasible in conjunction with reoxidization of the anthraquinone disulfonic acids by passage of an oxygen containing gas therethrough.

In U.S. Pat. No. 3,097,926 of Feb. 16, 1963 Niklin, et al. suggest that gases containing hydrogen sulfide may be treated to convert the $H_2S$ to elemental sulfur by bringing this sour gas into contact with a liquid alkaline absorption solution containing a metal vanadate such as sodium metavanadate, sodium orthovanadate or sodium ammonium vanadate. In the course of this reaction the vanadate is reduced and the [HS⁻] is oxidized to free sulfur. In the '926 Patent, it is also suggested that a chelating or sequestering agent such as sodium potassium tartrate or other soluble tartrate or tartaric acid or ethylene diamine tetracetic acid (EDTA) may be included with the vanadate to enhance the solubility of the vanadate in the presence of [HS⁻]. It is further indicated that iron salts such as ferrous sulfate or ferric chloride or salts of copper, manganese, chromium, nickel and cobalt may be incorporated in the solution in conjunction with a chelating agent such as EDTA or one of its derivatives, a tartrate or tartaric acid to enhance oxidation of the reduced vanadate during regeneration of the solution.

In U.S. Pat. No. 4,049,776 of Sept. 20, 1977, Nicklin, et al. suggest preparing a ferric ion sulfonated hydroxyl anthraquinone disulfonic acid complex at a pH below 5 and then adding this mixture to the main body of a vanadium-anthraquinone disulfonic acid system thereby precluding precipitation of iron hydroxide in the absorption medium.

Humphreys & Glassgow Limited received United Kindom Pat. Nos. 999,799 and 999,800 of July 28, 1965 describing a process for removal of hydrogen sulfide from sour gas in which the gas is washed with a solution of chelated iron of such nature that it is able to exist dissolved in the solution in both the ferric and ferrous states. Thus, the ferric ion upon reaction with $H_2S$ is reduced to the ferrous state as the hydrosulfide is oxidized to elemental sulfur. The ferrous iron may then be oxidized back to the ferric state using an agent such as air. Exemplary chelating agents for the iron include a number of amino acids preferably of the ethylene or trimethylene group.

B. Advantages and Limitations of Stretford Process

The Stretford process has met with substantial commercial success with over eighty plants having been built on a world-wide basis. Pollution abatement in a wide number of industries has been one controlling factor in its adoption and continuing use, particularly where relatively stringent environmental regulations must be met. Among the features of the process which have resulted in its widespread application are: Removal of high levels of hydrogen sulfide even when the inlet stream is at a relatively low pressure; selective removal of hydrogen sulfide; high turn-down operation; simple analytical testing with minimal technical supervision; rapid start-ups and shut-downs; the equipment may be constructed primarily of mild steel; and the sulfur recovered is generally of salable quality.

In spite of these attributes, many organizations faced with the necessity of treating a sour gas to remove hydrogen sulfide therefrom seek alternate procedures to the Stretford process; it is often employed only if no other hydrogen sulfide removal method will reduce the sulfur content of the gas to an acceptable level. The primary reason for this avoidance of the Stretford process if at all possible has been its relatively high operating costs because of loss of chemicals. The absorption solution used in a typical Stretford process has been found to be relatively unstable over prolonged periods of time and make-up expenses are often times totally exorbitant. In addition, sulfur fixation rates have been found to be much higher than anticipated rendering overall process economics even more subject to fluctuations in the cost of chemicals. The instability of Stretford solutions has caused many users to discard their entire inventory of solution and recharge the system. Because of the solution's toxic nature, this has resulted in numerous problems of disposal for owners of Stretford plants.

Stretford oxidation kinetics have been found to be non-homogenous, first order reactions. The reaction rate is somewhat influenced by increases in oxygen pressure. As a result, it has been concluded that the oxidation of Stretford solution is reaction rate controlled rather than a function of mass transfer. Tests were initiated to determine the oxidation rates of 2,7 anthraquinone disulfonic acid (ADA) in solutions without vanadium sequestrants. These tests found that the oxidation rate increased with the addition of ADA up to a concentration level of 1.3 to 1.5 grams per liter. Increases in ADA concentration to 10 grams per liter resulted in no increase in oxidation rate. Another series of tests were conducted using vanadium sequestrants. The addition of these sequestrants was found to slow the oxidation rate and change the reaction mechanism to homogenous first order. The ADA concentration was varied from 1 to 10 grams per liter during this series of tests and found to affect oxidation kinetics by linear relationship throughout the entire range of concentrations.

Some of the H$_2$S removed from sour gas by a Stretford unit is converted to sodium thiosulfate and sodium sulfate (both soluble salts) rather than elemental sulfur. These salts accumulate in the solution. Consequently, in commercial Stretford treatment plants, the alkaline absorption solution must be regularly purged to avoid precipitation of the least soluble components. This purge requirement is a major factor affecting Stretford chemical and operating costs.

Production of soluble salts is believed to proceed through three reaction paths:

1. Oxidation of bisulfide producing sodium thiosulfate $$2NaHS + 2O_2 \rightarrow Na_2S_2O_3 + H_2O$$

2. Formation of sodium thiosulfate by alkaline hydrolysis of elemental sulfur suspended in solution.

$$\tfrac{1}{2}S_8 + 4NaoH \rightarrow 2Na_2S_2O_3 + NaHS + H_2O$$

This reaction is accelerated at elevated temperatures and high solution pH.

3. Metabolic oxidation of sodium thiosulfate to sodium sulfate by Thiobacillus bacteria. The path is initiated by certain trace elements in the system. Thiobacillus are facultative bacteria, consequently, are capable of growing with or without oxygen.

The stability of ADA in Stretford solutions has also been investigated by a number of groups. Loss rates of 1-6% per day have been reported for commercial facilities. This loss is a major cost factor for large installations.

The reduction reaction of the Stretford process may be represented by the following:

$$2V(OH)_4^+ + 3H^+ + HS^- \rightarrow 2VO^{++} + 6H_2O + S°$$

The oxidation reaction is believed to be in accordance with the following:

$$4VO^{++} + 10H_2O + O_2 \xrightarrow{(ADA)} 4V(OH)_4^+ + 4H^+$$

2,7 anthraquinone disulfonic acid (ADA) in the Stretford process acts as an oxidation catalyst. However, there are also believed to be a significant side reaction in the Stretford process which can be represented as:

$$V(OH)_4^+ + H^+ + HS^- \rightarrow V(OH)_2S^+ + 2H_2O$$

where $V(OH)_2S^+$ is used to indicate the vanadium sulfide compound produced since its exact species is not known. The $V(OH)_2S^+$ reacts in the oxidizer with oxygen and sodium ions from the sodium vanadate and sodium carbonate in the Stretford solution to produce $Na_2S_2O_3$. $Na_2S_2O_3$ is an unwanted byproduct which is one of the reasons purging Stretford solutions over time are required thus raising the process chemical costs. The $V(OH)_2S^+$ also catalyzes the oxidation of ADA. This unwanted reaction consumes ADA, further raising chemical costs.

THE P-S PROCESS

The process of removing hydrogen sulfide from sour gas streams in accordance with this invention (herein generically referred to as the P-S Process) is accomplished by bringing the sour gas into H$_2$S absorbing relationship with a liquid alkaline absorption medium containing a unique vanadium-boron complex sequestrant capable of oxidizing hydrosulfide in the solution to elemental sulfur as the vanadium undergoes reduction while the boron constituent functions to inhibit formation of insoluble vanadium sulfide compounds. The solution may be readily regenerated by re-oxidizing the reduced vanadium with an oxygen-containing gas without deleteriously affecting recoverability of free sulfur from the absorption medium by virtue of the utilization of a oxidation catalyst forming a part of the solution which does not interfere in any way with functionality of the vanadium-boron complex.

The P-S Process of this invention is especially effective for treating H$_2$S containing gas streams for recovery of free sulfur therefrom by virtue of the fact that chemical make-up is substantially less than that encountered with Stretford solutions (as little as one-tenth of the cost), the P-S Process solution is a natural buffer thus eliminating the requirement of the Stretford process that carbon dioxide be in the feed gas for pH control and the P-S absorption solution is a natural biocide and therefore does not present problems of microbe growth that have been encountered with solutions in the Stretford process. The process described herein handles the same sulfur loadings as comparable Stretford facilities, the process steps of the P-S Process are generally the same as the processing operations of the Stretford process permitting conversion of existing Stretford facilities to the P-S Process by simple change of the solutions used therein, and the chemicals in the P-S Process are considerably less expensive than those required in a typical Stretford process.

In accordance with a preferred embodiment of the present invention, the P-S Process involves utilization of an alkaline liquid absorption medium which includes a vanadium-boron sequestrant complex prepared by combining a monovalent cation vanadate with a monovalent cation borate along with a buffering agent such as sodium carbonate. A quantity of a reoxidation catalyst is also included in the solution and preferably comprises an iron chelate prepared by combining an iron compound with a polyamine organic acid such as hydroxy ethyl ethylene diamine triacetic acid or ethylene diamine tetracetic acid. The sour gas stream is passed in cocurrent flow relationship to the absorption solution in a first absorption zone and then the solution is regenerated in a second, separate zone using an oxidizing medium such as air or pure oxygen. Sulfur-free gas goes overhead from the absorption zone; elemental sulfur is recovered from the oxidizing zone.

It is therefore, the primary object of the present invention to provide a process for removing hydrogen sulfide from sour gas streams which assures removal of H$_2$S at levels equivalent to that obtainable with conventional Stretford processing operations without attendant chemical losses encountered in Stretford plants and utilizing chemicals which are less costly to buy than those used in typical Stretford processes.

A further important object of the invention is to provide a process for removing H$_2$S from sour gas streams which allows the oxidation of H$_2$S to sulfur to proceed substantially stoichimetrically thus avoiding the formation of insoluble vanadium sulfides which when re-oxidized would produce sodium thiosulfate. In the absence of such stoichimetric reaction, insoluble vanadate would co-precipitate with the sulfur product thus resulting in vanadate loss and increase in the chemical make-up required.

Another important object of the invention is to provide a process for treating sour gas to remove $H_2S$ therefrom wherein the use of anthraquinone disulfonic acids in the absorption solution is avoided. Metal sulfides in contact with oxygen result in oxidation of organic catalysts such as 2,7 anthraquinone disulfonic acid generally used in Stretford processes. Oxidation of the organic catalysts is believed to occur through the formation of intermediate peroxides or persulfates. Once oxidized, the organic catalyst is ineffective as an oxidation catalyst.

A further important object of the invention is to provide a process for treating hydrogen sulfide containing sour gas streams to convert the $H_2S$ to elemental sulfur wherein the oxidizer is operated in a manner such that dissolved oxygen in the liquid can be depleted before total oxidation of the absorption medium occurs prior to return thereof to the reduction zone, thus providing the most efficient operation with minimum loss of chemicals.

DRAWING

The single FIGURE is a schematic representation in simplified form of equipment useful for carrying out the process of this invention and involving a mass transfer and reactor reduction zone followed by an oxidizer. The alkaline absorption medium undergoes reduction in the first zone as elemental sulfur is produced without formation of insoluble vanadium sulfide compounds and the vanadium is then re-oxidized in the oxidizer with sulfur going overhead as a froth.

DETAILED DESCRIPTION OF THE INVENTION

Sour gas to be treated and containing hydrogen sulfide is introduced into the treatment process via line 10. The gas stream may be natural gas containing $H_2S$ and $CO_2$ along with other gaseous constituents, it may be principally methane along with hydrogen sulfide and very little else, refinery off gas containing $H_2S$, synthesis gas or coal gasifier gas both containing significant levels of hydrogen sulfide, or other similar $H_2S$ containing gases. The sour gas is introduced into one end 12 of an enhanced mass transfer mixing device 14 which also has an inlet 16 for regenerated liquid absorption solution supplied thereto via line 18. Device 14 may be of the type which is a long tubular member having a series of stationary angularly located blades therein which causes the fluid flowing therethrough to follow a spiral swirl path for intimate admixing of gas and liquids furnished to the device. It is to be noted from the FIGURE that the flow of sour gas and regenerated absorption liquid through device 14 is in cocurrent relationship such that the fluids leave the unit 14 through common effluent line 20.

A packed column and separator vessel 22 is downstream from mass transfer device 14 whereby the influent to the packed column section 24 of vessel 22 enters at the lower part thereof. Sweet gas separated from the absorption medium is therefore allowed to go overhead through outlet line 26 while the liquid absorption medium collects in separator section 27. The liquid underflow from vessel 22 is directed via line 28 into the upper end of oxidizer tank 30.

A source of oxygen is connected to the lower end of tank 30 and may take the form of a line 32 leading to a source of air or pure oxygen and having a compressor 34 therein as well as a selectively controllable supply valve 36. Means to mechanically agitate the solution in tank 30 to assure intimate contact between the air and the liquid may take a number of forms with a mechanical stirrer 38 being illustrated for exemplary purposes only. Sulfur froth is removed from tank 30 via line 40 while the re-oxidized liquid absorption medium is removed from the bottom of tank 30 and conveyed via line 42 to a combination surge and pump tank 44 also optionally provided with a stirring device such as the mechanical stirrer 46 schematically illustrated in the drawing. The output line 48 from surge tank 44 has a pump 50 therein and leads to the inlet of a heat exchanger 52. The outlet of exchanger 52 is joined to supply line 18 communicating with the inlet of the mass transfer device 14. Either cooling water or a heating fluid such as steam may be passed through one side of the heat exchanger 52 to control the temperature of the liquid absorption medium returned to device 14 via line 18 depending upon the operating conditions established for a particular process.

As an alternate method of operating the process, part of the re-oxidized absorption medium recycled from oxidizer 44 may be directed via line 54 into the top of vessel 22 for countercurrent contact with the gas in the packed section 24. Valve 56 in line 54 allows selective control over partial diversion of the absorption medium or total direction of the absorption agent to mixer 14 for cocurrent contact with the gas.

As briefly indicated above, the liquid alkaline absorption medium employed in the sulfur oxidation process of this invention preferably includes a borate complex of vanadate ion. The ratio of boron to vanadium on a molar basis is at least 1:1 although the preferred composition is a 2:1 boron to vanadium molar ratio. The complex may be prepared by the use of vanadium pentoxide, or by monovalent cation vanadates such as sodium, potassium or ammonium vanadate dissolved in aqueous solutions of alkyl metal salts such as sodium carbonate. These alkaline metal salts also have the function of acting as a buffer in the overall absorption solution. The borate may be added as boric acid or monovalent cation borates such as ammonium borate, potassium borate or sodium tetraborate. Borax may also be used in preparing the vanadium-boron complex.

Assuming that sodium vanadate is used in combination with the boron compound in preparing the absorption solution, it has been determined that there should be at least 3.65 grams per liter of sodium vanadate based on a solution loading of 500 parts per million hydrosulfide. Similarly, if boric acid is combined with the sodium vanadate, 5.6 grams per liter of $H_3BO_3$ should be added. The sodium carbonate in the solution maintains the pH thereof at the desired level of about 8.5 to about 9.5 and provides the alkaline solution for initial absorption of $H_2S$ and formation of hydrosulfide ($H_2S + Na_2CO_3 \rightarrow Na^+HS^- + NaHCO_3$). The amount of sodium carbonate in the solution can range from about 0.1 molar to approximately 0.5 molar, i.e. 0.5 grams per liter to 26 grams per liter. The preferred parameter is about 10 grams of sodium carbonate per liter of solution.

Insofar as the re-oxidization catalyst is concerned, if ferrous sulfate is used as the iron source, one gram per liter of $FeSO_4.7H_2O$ should be provided along with a polyamine organic acid, e.g. 1.85 grams per liter of hydroxy ethyl ethylene diamine triacetic acid (HEEDTA). It has been found that there should be at least 0.8 moles of HEEDTA per mole of iron. Preferred is 1.5 moles of HEEDTA or its equivalent per mole of iron as Fe. Exemplary in this respect would be 0.0035 moles of Fe and 0.00537 moles of HEEDTA per liter of solution.

The re-oxidation catalyst may be prepared by combining various iron and polyamine organic acids. For example, in place of HEEDTA, ethylene diamine tetracetic acid may be used and as alternate iron sources, it has been found that although ferrous sulfate is preferred, ferric chloride may be used as can be ferric carbonate and ferric and ferrous hydroxides and oxides. In view of the fact that it was discovered formation of vanadium sulfide intermediates during reduction of vanadium results in rapid degradation of re-oxidation catalysts such as ADA or iron polyamine agents significantly reducing their effectiveness with time, an important aspect of this invention has been the discovery that use of a vanadium-boron complex for [HS$^-$] oxidation prevents degradation of re-oxidation catalyst such as those of the iron-polyamine type.

Generally speaking, the total residence time of the absorption liquid in the combination of mass transfer device 14 and reactor vessel 22 should be about 10 minutes. In practical effect residence time in mixer 14 per se is generally no more than about 5 seconds. In the same manner, the total residence time of the solution in oxidizer 30 should be approximately 40 minutes.

The pressure of the sour gas introduced through line 10 has no significant bearing on the operation of the overall process and may vary for example from as little as atmospheric to as much as 2,000 psi. If a substantial amount of carbon dioxide is present in the sour gas causing the stream to have a high $CO_2$ partial pressure, this has a depressing effect on the mass transfer of $H_2S$ absorption but does not stop such absorption, it merely depresses the same to a certain extent. The temperature of the incoming gas is also not highly critical although in most instances such gas will be approximately ambient or in the range of 60° F. to about 90° F. Insofar as the absorption solution temperature is concerned, the temperature should be somewhat elevated and generally in the range of about 85° F. to 150° F. The hotter the better in this respect with the primary limiting factor being the cost of heating the solution through the medium of exchanger 52 and increasing thiosulfate formation through sulfur hydrolysis. Best results are obtained if the solution is kept within the range of about 104° F. to approximately 122° F.

The temperature of the air or oxygen supplied to oxidizer 30 through line 32 is also not critical and is generally at ambient or the temperature thereof which results from compression of the same.

In the reduction zone made up of device 14 and reactor vessel 22, the sour gas is contacted with the alkaline aqueous solution containing vanadium-boron complex. Since the $H_2S$ is absorbed in the sodium carbonate buffered alkaline conditions of the absorption medium and forms [HS$^-$] ions, the hydrosulfide is oxidized to elemental sulfur and the boron-vanadium complex is reduced in accordance with the following formula:

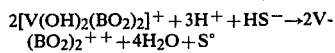

The oxidation reaction on the other hand of the present process may be represented as:

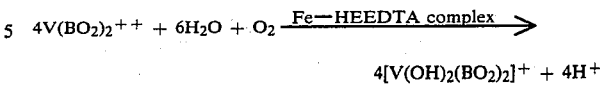

This chemistry results in substantially the same overall reaction as occurs in the Stretford process of $H_2S + \frac{1}{2} O_2 \rightarrow S + H_2O$.

It was discovered in this respect that the addition of boric acid or a similar boron compound to a solution containing a vanadate will result in a vanadium-boron complex where the vanadium undergoes reduction in conjunction oxidation of hydrosulfide to elemental sulfur. The vanadium-boron complex was found to hinder the production of $VS_x$. To take advantage of this discovery and provide a process which can be used to remove $H_2S$ from gas streams, it was necessary to employ a new catalyst as a replacement for the anthraquinone disulfonic acid catalyst commonly used in Stretford processes since the boron constituent of the complex retards the catalytic affect of ADA. It was further discovered in this respect that an iron complex of a polyamine organic acid such as HEEDTA or EDTA effectively catalyzes the re-oxidation of the vanadium-boron complex in a minimum of time and without interferring with removal and recovery of free sulfur from the solution.

Thus, since it is important to assure that the vanadium which undergoes reduction at the same time that hydrosulfide is oxidized remains totally in solution and does not react with the sulfur to provide unwanted vanadium sulfides, the vanadium must be totally complexed in the system. It was discovered that a boron compound combined with the vanadium compound used accomplishes this function with the most effective results. The vanadium is therefore maintained in a totally homogenous soluble state. In order to allow the vanadium-boron complex to be used effectively though, it was found essential to replace the anthraquinone disulfonic acid oxidizing catalyst previously employed in Stretford processes and in this respect, the iron-polyamine catalyst described were found to promote re-oxidation of the vanadium without interferring with the reduction potential of the vanadium-boron complex in the mass transfer and reactor zone of the process. Thus, it was unexpectedly found that the vanadium-boron complex is able to react with hydrogen sulfide and to be regenerated by simple air oxidation in a manner very similar to Stretford processes, at reduction and oxidation rates comparable to those inherent in the Stretford process and utilizing exactly the same equipment. Another unexpected benefit in this respect is the finding that the amount of solution required to be purged per mole of $H_2S$ removed is substantially less with the P-S process than with known Stretford processes.

In the preferred process, the oxidation zone is operated in a manner such that the effluent thereof is only partially returned to the fully oxidized state. This means that dissolved oxygen in the oxidizer is completely depleted prior to transfer of the solution back to the reduction zone. Oxygen in the reduction zone has the same detrimental effect as sulfide in the oxidation zone. As a result, it is desirable not to effect complete reoxidation of the vanadium-boron complex in the oxidizer prior to return thereof to the mass transfer device 14. In a preferred operation for example, about 90% of the vanadium flowing into the oxidizer 30 through the inlet line 28 has a valence of 4 whereas the $V_4$ content of the liquid leaving the oxidizer through line 42 is about 3%.

In the course of evaluating the solution oxidation-reduction kinetics of the P-S Process it was determined that Stretford solutions consume more oxygen than predicted by the general overall reaction equation of:

$$H_2S + \tfrac{1}{2}O_2 \rightarrow S^\circ + H_2O$$

The P-S Process solution, however, uses the amount of oxygen anticipated by the overall reaction. Table I hereunder summarizes the results of the oxygen consumption tests with both the P-S Process and the Stretford process.

TABLE I

|  |  | GM/Liter |
| --- | --- | --- |
| Stretford Vanadium—ADA |  |  |
| Sodium vanadate |  | 1.85 |
| ADA—2Na |  | 3.0 |
| Na$_2$CO$_3$ |  | 26.0 |
| P-S Process Vanadium—Boron |  |  |
| Sodium vanadate |  | 3.68 |
| H$_3$BO$_3$ |  | 3.76 |
| Fe—HEEDTA Catalyst |  | 2.85 |
| Na$_2$CO$_3$ |  | 28.60 |
| System | Temp. C. | % Stoichiometric Oxygen Consumption |
| Stretford | 24. | 99.5 |
| Stretford | 35. | 103.5 |
| Stretford | 40. | 112.5 |
| Stretford | 45. | 118.1 |
| Stretford | 56. | 119.4 |
| P-S | 40. | 99.8 |
| P-S | 40. | 99.1 |
| P-S | 40. | 98.6 |
| P-S | 40. | 99.9 |
| P-S | 40. | 98.8 |
| P-S | 40. | 99.0 |
| P-S | 56. | 103.0 |

The preceding tests support the conclusion that the primary path for production of soluble sulfur salts is the oxidation of sulfide during the oxidation reduction cycle, since non-homogenous reaction kinetics and non-stoichiometric oxygen consumption suggest the formation of an insoluble vanadium sulfide intermediate. The reaction rate controlling step is the rate at which the precipitate dissolves. Oxidation of the metal of the intermediate metal sulfide produces thiosulfate rather than sulfur.

I claim:

1. In a method of removing $H_2S$ from a sour gas by oxidation of the $H_2S$ to free sulfur, the improved steps of:

bringing the sour gas into $H_2S$ absorbing relationship with a liquid alkaline absorption medium whereby $H_2S$ is absorbed and at least part thereof forms $[HS^-]$ ions, said liquid absorption medium being essentially devoid of anthraquinone disulfonic acid compounds and containing a vanadium-boron complex capable of oxidizing the $[HS^-]$ ions to produce elemental sulfur as the vanadium undergoes reduction and the boron constituent functions to inhibit formation of insoluble vanadium sulfide compounds and consequent thiosulfate formation upon re-oxidation of the vanadium, the ratio of boron to vanadium in said absorption medium being at least about 1:1;

regenerating the absorption medium by adding an oxygen source thereto to oxidize the reduced vanadium; and providing a sufficient quantity of an iron complex catalytic agent during regeneration of the absorption medium which is capable of catalyzing re-oxidation of the reduced vanadium to enhance oxidation of the latter without deleteriously affecting recoverability of free sulfur from the absorption medium.

2. In a method as set forth in claim 1 wherein is included the step of discontinuing re-oxidation of the vanadium in said complex prior to stoichiometric completion thereof.

3. In a method as set forth in claim 1 wherein said iron complex catalytic agent is provided by combining an iron compound with a polyamine organic acid selected from the group consisting of ethylene diamine tetraacetic acid and hydroxyethyl ethylene diamine triacetic acid.

4. In a method as set forth in claim 3 wherein said iron compound is ferrous sulfate.

5. In a method as set forth in claim 3 wherein said iron compound is ferric chloride.

6. In a method as set forth in claim 3 wherein said iron compound is ferrous ammonium sulfate.

7. In a method as set forth in claim 3 wherein said iron compound is ferric carbonate.

8. In a method as set forth in claim 3 wherein said iron compound is ferric hydroxide.

9. In a method as set forth in claim 3 wherein said polyamine organic acid is ethylene diamine tetracetic acid.

10. In a method as set forth in claim 3 wherein said polyamine organic acid is hydroxyethyl ethylene diamine triacetic acid.

11. In a method as set forth in claim 1 wherein said complex is formed by combining a monovalent cation vanadate with a monovalent cation borate.

12. In a method as set forth in claim 11 wherein said monovalent cation vanadate is sodium vanadate.

13. In a method as set forth in claim 11 wherein said monovalent cation vanadate is potassium vanadate.

14. In a method as set forth in claim 11 wherein said monovalent cation vanadate is ammonium vanadate.

15. In a method as set forth in claim 11 wherein said monovalent cation borate is sodium borate.

16. In a method as set forth in claim 11 wherein said monovalent cation borate is ammonium borate.

17. In a method as set forth in claim 11 wherein said monovalent cation borate is potassium borate.

18. In a method as set forth in claim 11 wherein said monovalent cation borate is boric acid.

19. In a method as set forth in claim 11 wherein said monovalent cation borate is borax.

20. A method as set forth in claim 1 wherein said liquid absorption medium includes sodium carbonate.

21. A method as set forth in claim 20 wherein said sodium carbonate is present in an amount ranging from about 5 grams thereof per liter of liquid to approximately 26 grams per liter.

22. A method as set forth in claim 1 wherein the ratio of boron to vanadium in said complex is approximately 1:1 on a molar basis.

23. A method as set forth in claim 1 wherein the ratio of boron to vanadium in said complex is approximately 2:1 on a molar basis.

24. A method as set forth in claim 3 wherein is provided about 1½ moles of said polyamine organic acid for each mole of iron compound combined therewith.

25. A method as set forth in claim 1 wherein is included the step of carrying out the absorption of said $H_2S$ in said liquid absorption medium at a temperature within the range of about 85° F. to about 150° F.

26. A method as set forth in claim 1 wherein said oxygen source is air.

27. A method as set forth in claim 1 wherein said oxygen source is pure oxygen.

28. A method as set forth in claim 1 wherein is included the step of passing the sour gas in cocurrent relationship to the liquid absorption medium during absorption of $H_2S$ by the medium.

29. A method as set forth in claim 28 wherein is included the step of swirling the sour gas and said liquid absorption medium during cocurrent flow relationship to enhance contact therebetween.

30. A method as set forth in claim 1 wherein said sour gas and the liquid absorption medium are maintained in reducing relationship for a time of about 10 minutes.

* * * * *